UNITED STATES PATENT OFFICE.

JAMES G. WALLACE, OF NEW YORK, N. Y.

TYPE-WRITER.

1,114,557.

Specification of Letters Patent. Patented Oct. 20, 1914.

Application filed June 3, 1913. Serial No. 771,512.

*To all whom it may concern:*

Be it known that I, JAMES G. WALLACE, a citizen of the United States, residing at New York city, in the county of New York and State of New York, have invented new and useful Improvements in Type-Writers, of which the following is a specification.

The general object of the invention is to improve the construction of the escapement mechanism of typewriting machines in point of reducing to a minimum the number of parts heretofore employed in the construction of this mechanism. And to this end the invention resides in certain combinations and arrangements of parts hereinafter more fully described and particularly pointed out in the appended claim.

Other objects will appear and be better understood from that embodiment of my invention of which the following is a specification, reference being had to the accompanying drawings forming part hereof, in which:—

Figure 1 is a vertical longitudinal section of a typewriter frame showing my invention partly in section and elevation. Fig. 2 is a detail perspective of the arbor or escapement carrier. Fig. 3 is a sectional detail showing the escapement pawls. Fig. 4 is a fragment of one end of the carriage.

The elements of the escapement mechanism are herein shown to comprise a rack bar 5, a stationary pawl 7 and a movable spring actuated pawl 6. The rack bar 5 is positioned on the bottom of the carriage 8 so that its teeth extend downwardly and into the space between the guides 9—9.

The pawls 6 and 7 are arranged so as to cross and intersect the path of movement of the rack bar 5, the said pawls being positioned so that the movable pawl 6 normally engages with the rack bar and when so engaging it is rocked out of its normal position by virtue of the pull exerted thereon by the spring-actuated carriage 8. This has the effect of tensioning the spring 10 of the said pawl 6 so that upon lateral movement in the direction shown by the dotted lines in Fig. 1, the said pawl will be restored to its normal position when moved from engagement with the rack bar 8. Prior to final disengagement of the said pawl from the rack bar the succeeding stationary pawl 7 following the movement of the pawl 6 takes the same tooth in the rack bar which the pawl 6 is leaving, whereby, to hold the rack bar and the parts connected thereto, stationary, when the pawl 6 is wholly disengaged from the rack bar. Now
upon being freed the said pawl 6 is rocked to its normal position by the action of its spring 10 and the distance between its former and normal position corresponds to that between remote sides of adjacent teeth in the rack bar or approximately so, whereby, to have the said pawl 6 engage with the tooth succeeding that engaged by the pawl 7 while the said pawls are being restored to their normal positions, as shown in Fig. 1.

Now inasmuch as the carriage is actuated by a spring (not shown) to move in one direction it will be manifest that the arrangement of the pawls is such as to control the carriage to move with a step by step movement each time that the pawls are oscillated into and out of the path of movement of the rack bar. The mechanism which operates the pawls 6 and 7 to functions as just described is in turn operated by the elements which go to make up the key board. This mechanism includes a suitable arbor or support herein shown in the form of an inverted U-shaped yoke 11. This yoke extends transversely of the space between the sides of the frame of the machine, and since the yoke is preferably formed of a single piece of sheet metal bent into the shape shown, it is manifest that it forms a simple and inexpensive substitute for its relatively complex and expensive equivalents now employed in the ordinary typewriting machine. The arbor is mounted to oscillate in the frame *a* and the pivots one of which is shown in Fig. 1 and indicated by 12 which support the said arbor, pass through the opposite sides of the frame *a* and through the openings 13—13 in the vertical limbs of the arbor. The horizontal portion of the said arbor is suitably adapted for connection to the pawls 6 and 7, the said horizontal portion being herein shown recessed and rabbeted as indicated generally by 14 in Fig. 3, to receive the frame 15 which carries the pawls 6 and 7.

The universal bar is indicated by 16. Single elements are employed for effecting connection between this universal bar 16 and the arbor 11, one of such elements is shown in Fig. 1 and conforms substantially to a bell crank 17 fulcrumed as indicated at 18 and having one arm fitted to the universal bar 16 and its opposite arm provided with a forwardly directed extension 18. Pin and slot connections 19—19 are employed for effecting connection between the said extension 18 and one of the arms of the arbor 11, whereby, to compensate for the diversity between the arcs of movement of the yoke and the bell cranks.

The key and spacing bars one of which is shown in Fig. 1 and indicated by 20, are arranged between the limbs of the arbor 11 and fulcrumed at one end on the pin 21 and have their middle portions superimposed on the universal bar 16, whereby, to effect the rocking of the bell cranks and the oscillation of the arbor and the parts carried thereby when they are separately depressed. Suitable restoring devices such as springs, may be employed for yieldingly holding the arbor in its normal position as shown in Fig. 1 and stops may be employed for limiting the movement of the said arbor.

What is claimed as new is:

In a typewriter a frame, a carriage movably mounted thereon and having a rack bar, a key pivoted to the frame, a bell crank lever pivoted to the frame, a bar carried by the lower arm of the bell crank lever and lying under the key, a single piece yoke pivoted to the frame and having pawls mounted directly thereon and carried thereby, said pawls being engageable with the rack bar, said bell crank lever having at its upper arm a forward extension, and a pin and slot connection between the said extension and the yoke, the parts being so arranged that upon depression of the key the pawls are pulled transversely across the rack bar.

In testimony whereof I affix my signature in presence of two witnesses.

JAMES G. WALLACE.

Witnesses:
JOHN A. DONEGAN,
GEO. A. BYRNE.